United States Patent [19]

Barkley et al.

[11] 4,063,842
[45] Dec. 20, 1977

[54] ADJUSTABLE BORING BAR

[75] Inventors: George G. Barkley, New Alexandria; Edward L. Sorice, Crabtree, both of Pa.

[73] Assignee: Kennametal Inc., Latrobe, Pa.

[21] Appl. No.: 675,322

[22] Filed: Apr. 9, 1976

[51] Int. Cl.² .............................................. B23B 29/02
[52] U.S. Cl. .................................. 408/146; 85/1 SS; 279/83; 408/153; 407/92
[58] Field of Search .................. 408/146, 147, 153, 159, 408/714, 181, 185, 232, 238, 239, 197, 198, 179, 186; 279/83; 403/362; 85/1 SS; 29/96; 82/36 R

[56] References Cited

U.S. PATENT DOCUMENTS 2,362,053  11/1944  Danielson .......................... 279/83 X
3,877,832  4/1975  Benjamin .......................... 408/238 X Primary Examiner—Harrison L. Hinson
Assistant Examiner—Z. R. Bilinsky
Attorney, Agent, or Firm—Lawrence R. Burns

[57] ABSTRACT

An adjustable head arrangement for the shank of a boring bar is disclosed having an easily replaceable tool unit and also having an axially adjustable abutment means on the tool unit so that the cutting point of the tool unit is firmly supported and held during cutting operations but is adjustable with respect to the shank of the boring bar in between different cutting operations.

5 Claims, 4 Drawing Figures

4,063,842

ADJUSTABLE BORING BAR

BACKGROUND OF THE INVENTION

In numerically controlled cutting machines used today, machines are usually programmed by tape to perform certain specified operations upon a workpiece in a certain preprogrammed sequence. Due to the repetitive nature of the work, a reference dimension is programmed into the machine on the tape and this reference dimension is usually a certain given distance from a datum point on the machine to the actual cutting point of a machine tool.

This cutting point may rest on any one of several differently configured cutting inserts depending upon the cutting operation to be performed. However, it is the case that the dimension of the cutting point from the datum plane of the cutting machine must always be maintained to a very precise degree in order to hold the workpiece within the required tolerances of manufacture.

Since most numerically controlled cutting machines use the replaceable type cutting inserts of varying configurations, there is a difficulty in maintaining the precise dimension mentioned above when interchanging cutting insert configurations or replacing cutting inserts when they have become worn.

One of the ways in which this difference in dimensions may be corrected is to reprogram the tape in the numerical controlled machine when the reference dimension to the cutting point changes due to a change of the actual cutting tool itself.

A preferable way to compensate for the change that may be introduced with a new cutting tool is to have a structure that allows adjustment of the reference cutting point with respect to the shank of the cutting tool that is supported by the numerical controlled type machine.

It is an object of the present invention to provide an adjustable tool unit in a boring bar head so that, as tool units are interchanged in the head, the cutting point may be readjusted to agree with the dimension programmed on the tape of the numerical controlled machine.

It is a further object of the present invention to provide a tool unit that, while being adjustable, is also firmly supported and held during the actual cutting operations.

It is still a further object of the present invention to provide a structure that will accomplish the above objects and yet may be provided in some of the smaller boring bar shanks that are required to do machining in a very small bore of a workpiece.

BRIEF SUMMARY OF THE INVENTION

According to the present invention, a perforation is formed in the face of a boring bar shank in a tool unit which is telescopically and slidingly engaged in the perforation. The tool unit has one end forming a cutting tool and an opposing end which forms a close fit with the perforation in the shank.

Threads are formed on the tool unit between the cutting tool end and the opposing end and a threaded ring-like member is mounted on the threaded portion of the tool unit and abuts the face portion of the boring bar shank. The tool unit is positioned such that the cutting tool end overhangs and protrudes from the face of the shank so as to present a cutting point for machining operations.

The threaded ring-like member which abuts the face portion of the shank when rotated in one direction or the other will advance the tool unit outwardly on the boring bar shank or allow the tool unit to be advanced inwardly of the boring bar shank. A recess is formed in the opposing end of the tool unit and a clamp means, preferably in the form of a dog-point set screw, is located in the body of the boring bar shank in a region which is associated with the recess of the opposing end of the cutting tool unit.

The clamp means is operable so as to advance downwardly into the groove of the tool unit and engage the groove such that, first of all, the tool unit is held in nonrotative relationship with the perforation of the boring bar shank and, further, the opposing end is forced into abutment with a portion of the walls of the perforation.

The threaded ring-like member on an oppositely facing surface from its abutment surface with the shank has equally spaced machine markings thereon which are calibrated in coordination with the type of threads between the ring member and the tool unit such that, when the machine markings are rotated past a given fixed machine marking, each marking will represent an axial advance of the cutting point on the tool unit or will represent an axial recession into the boring bar of the cutting point on the tool unit. The exact nature of the present invention will become more clearly apparent upon reference to the following detailed specification taken in connection with the accompanying drawings in which:

DETAILED DESCRIPTION OF THE INVENTION

Figure 1:
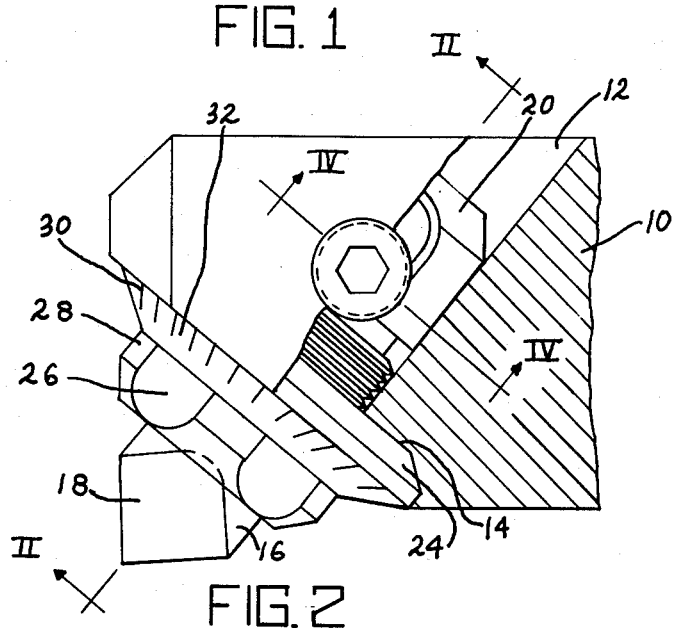
FIG. 1 is a partially broken away plan view showing the arrangement of the present invention.

Referring to the drawings somewhat more in detail, shown in FIG. 1 is an outer end of a boring bar shank 10 which, on its inner end, is connected and supported to a cutting machine, not shown. A perforation 12 is formed in the outer end transverse to the axial direction of the boring shank 10. This perforation 12 is formed through a face portion 14 which has been formed also in the outer end of the boring shank 10 and tool unit 16 is inserted in the perforation 12.

Tool unit 16 is preferably cylindrical in nature and has opposing ends with one end 18 forming a cutting tool and the other end 20 forming a close sliding fit with the configuration of perforation 12. An axially adjustable abutment ring 12 is mounted on the tool unit 16 between opposing ends 18 and 20, preferably by interengaging thread means between tool unit 16 and the ring 22.

Ring 22 has a face 24 that abuts against face portion 14 of boring bar shank 10. Wrench flats 26 are placed on protruding portion 28 of ring member 22 in order that the ring member may be rotated. Machine markings 30 are shown on ring member 22 and extend completely around the periphery of the dial portion 32 of ring member 22.

Figure 2:
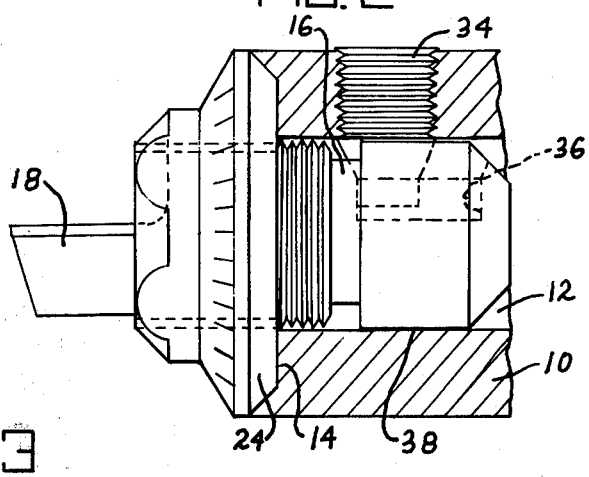
FIG. 2 is a view taken along section II—II of FIG. 1.

Referring now to FIG. 2, what is shown therein is the outer end of the boring shank 10 shown with perforation 12 with the cutting point end 18 of the tool unit 16 overhanging shank 10. The ring-like member 22 is threadedly mounted on the tool unit 16 and the face 24 is in abutment with the face portion 14. A clamping means 34, which is preferably a dog-point set screw, is located in the body of boring bar shank 10 and extends downwardly into slot 36 which is formed in the opposing end 20 of tool unit 16.

The clamping means 34 is operable upon rotation to advance either radially inwardly on the boring bar or radially outwardly of the boring bar 10 so as to engage and disengage with slot 36. When clamp means 34 is advanced radially outwardly, it will be disengaged with slot 36 and tool unit 16 along with ring member 22 may be completely removed from the outer end of the boring bar 10 and replaced with a new and different tool unit 16, possibly having a different configuration from what is shown.

The tool unit 16 is placed in the perforation 12 and abutment is achieved between face 24 of ring member 22 and the face portion 14 of boring bar 10. Rotation of the ring-like member will positively advance cutting tool portion 18 from the boring bar 10 or allow the cutting tool 18 to be actually advanced inwardly of perforation 12 to a desired reference dimension.

When the desired reference dimension is achieved, clamp member 34 is advanced radially inwardly of the boring bar shank 10 such that it engages the recess 36 and firmly holds the opposing end 20 of tool unit 16 between the clamp member 34 and a wall 38 of perforation 12. The clamp member 34 also by engaging the recess 36 will hold the tool unit 16 in a nonrotatable relationship of the boring bar shank 10.

Figure 3:
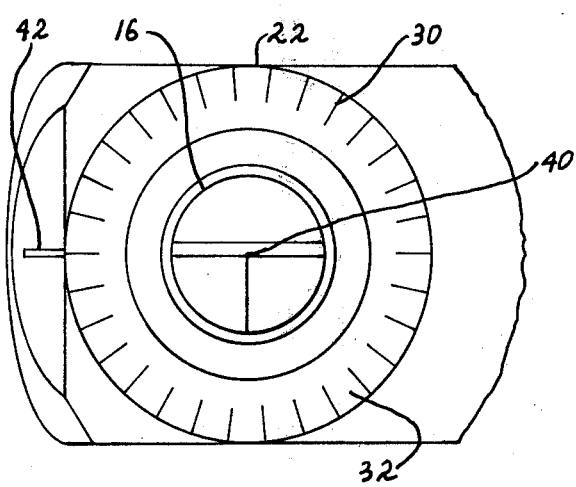
FIG. 3 is a view taken looking in the left end of FIG. 2.

Referring now to FIG. 3, what is shown therein is, first of all, the cutting point 40 of the cutting tool 18 and the ring member 22 is mounted on the tool unit 16 and has machine markings 30 completely around the dial portion 32. The machine markings 30 are rotated past a fixed machine marking 42 which is permanently marked on a convenient surface of boring bar 10.

The machine markings 30 are calibrated with the specific pitch of the threads that interengage ring member 22 with the tool unit 16 so that rotation of machine markings past the stationary machine marking 42 will provide a known axial movement on cutting point 40 in relation to the boring bar shank 10.

Figure 4:
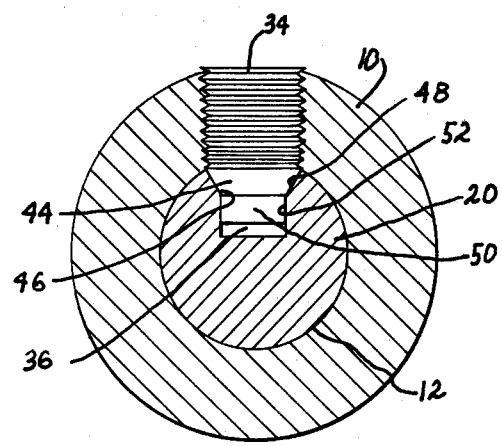
FIG. 4 is a view along section IV—IV of FIG. 1.

Referring to FIG. 4, what is shown therein is tool unit 16 opposing unit 20 which has a close sliding fit with the perforation 12 in the boring bar 10. The clamp member 34 which is again preferably a dog-point set screw is shown engaged with the recess 36 formed in opposing end 20 of tool unit 16. The clamp member is shown operated radially inwardly into a fully clamped position such that conical portion 44 of clamp member 34 engages sloping walls 46 and 48 of the recess 36.

The clamping force from clamp member 34 is transmitted to the walls 46 and 48 of recess 36 so as to firmly hold the opposing end 20 clamped between the clamp member 34 and the walls of the perforation 12.

The lower end portion 50 of clamp member 34 engages parallel walls 52 of recess 36 with a very close fit so that the opposing end 20 is held in a nonrotatable relationship with the boring bar 10. Preferably, the lower end 50 of clamp member 34 is dimensioned so as not to contact the bottom walls of recess 36.

Other advantages of having an adjustable cutting point according to the structure herein disclosed are that the adjustable cutting point provides a means of adjustment for machining various diameters on a workpiece. By simply adjusting the cutting point, the machine operator may change the diameter of the bore of a workpiece which is being machined or he may increase or decrease the outside diameter of a round bar which is being machined. This adjustment, of course, is also available when the tool itself is rotating and the workpiece is held stationary.

Modifications may be made within the scope of the appended claims.

What is claimed is:

1. An adjustable head for a boring bar comprising; a tool shank, a tool unit slidably mounted in a perforation in said tool shank, means for adjusting said tool unit axially along said perforation, an axially extending slot formed on said tool unit and having substantially parallel radially inner walls and inwardly converging radially outer walls, a clamp member having first means for engaging the inner wall and second means for engaging the outer walls, said clamp member being positioned between said tool shank and said tool unit so that the first means engages only the radially inner walls in a first position, and in a second position said clamp member first means engages said radially inner walls and said second means engages said radially outer walls in a second position.

2. An adjustable head according to claim 1 in which said clamp member comprises a member screw threadedly mounted in said tool shank operable upon rotation to advance and retreat toward said tool unit.

3. An adjustable head according to claim 2 wherein said threaded screw member first means and second means comprises, respectively, the lowermost portion adapted to engage said radially inner walls and a tapered portion for engagement with said radially outer walls.

4. An adjustable head according to claim 3 wherein said lowermost portion is cylindrically shaped and said upper portion is conically shaped.

5. An adjustable head according to claim 3 in which said clamp member comprises solely said threaded screw member.

* * * * *